United States Patent
Xiao et al.

(10) Patent No.: US 11,070,559 B2
(45) Date of Patent: Jul. 20, 2021

(54) SYSTEM AND METHOD FOR SUPPORTING OBJECT-BASED SECURITY

(71) Applicant: Oracle International Corporation, Redwood Shores, CA (US)

(72) Inventors: Dongbo Xiao, Edison, NJ (US); Lily He, Beijing (CN); Thomas Barnes, Whtehouse, NJ (US); Simon Meng, Beijing (CN); Jigang Wang, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 215 days.

(21) Appl. No.: 16/027,619

(22) Filed: Jul. 5, 2018

(65) Prior Publication Data
US 2019/0068606 A1    Feb. 28, 2019

Related U.S. Application Data

(60) Provisional application No. 62/549,343, filed on Aug. 23, 2017.

(51) Int. Cl.
*G06F 7/04*      (2006.01)
*H04L 29/06*    (2006.01)
(Continued)

(52) U.S. Cl.
CPC ............ *H04L 63/102* (2013.01); *G06F 9/546* (2013.01); *G06F 21/629* (2013.01); *H04L 51/16* (2013.01);
(Continued)

(58) Field of Classification Search
CPC ....... H04L 63/102; H04L 51/16; H04L 51/18; H04L 65/1063; H04L 67/02;
(Continued)

(56) References Cited

U.S. PATENT DOCUMENTS 7,284,233 B2 * 10/2007 Sengodan ............ G06F 40/117
                                                                 717/102
8,316,083 B2 * 11/2012 Xiao ...................... G06F 9/546
                                                                 709/203
(Continued)

OTHER PUBLICATIONS

Pei, Yuanteng (Jeff), "REST Commander: Scalable Web Server Management and Monitoring", Mar. 11, 2014, 3 pages. Retrieved on Sep. 12, 2017 from http://ebaytechblog.com/2014/03/11/rest-commander-scalable-web-server-management-and-monitoring/.
(Continued)

*Primary Examiner* — Samson B Lemma
(74) *Attorney, Agent, or Firm* — Tucker Ellis LLP

(57) ABSTRACT

In accordance with an embodiment, described herein is a system and method for supporting object-based security features for use with messaging services in an application server environment. Credentials can be associated with a JNDI initial context or a JMS connection instead of a thread. For JNDI operations, a lookup call from the initial context can use a security subject in an initial context regardless of a security subject attached to a current thread of the lookup call. For JMS operations, the object-based security model can be enabled on a JMS connection factory, which is used to create a JMS connection associated a security subject based on credentials supplied to create the JMS connection. The JMS connection performs a plurality of JMS operations on different threads using the security subject. The object-based security model is automatically enabled for JMS connection operations once the JMS is accessed using an OBS-enabled JNDI context.

20 Claims, 9 Drawing Sheets

(51) Int. Cl.
*H04L 12/58* (2006.01)
*H04L 29/08* (2006.01)
*G06F 21/62* (2013.01)
*G06F 9/54* (2006.01)

(52) U.S. Cl.
CPC .......... *H04L 51/18* (2013.01); *H04L 65/1063* (2013.01); *H04L 67/10* (2013.01); *H04L 67/02* (2013.01); *H04L 67/42* (2013.01)

(58) Field of Classification Search
CPC ...... G06F 21/629; G06F 9/546; H04W 76/15; H04W 76/19; H04W 36/0069
USPC .......................................................... 726/6
See application file for complete search history.

(56) References Cited

U.S. PATENT DOCUMENTS

| | | | |
|---|---|---|---|
| 10,063,508 B2* | 8/2018 | Wells | H04L 51/16 |
| 2002/0184312 A1 | 12/2002 | Chen | |
| 2003/0014554 A1* | 1/2003 | Williamson | G06F 9/546 |
| | | | 719/313 |
| 2004/0215725 A1 | 10/2004 | Love | |
| 2005/0216585 A1 | 9/2005 | Todorova | |
| 2005/0240654 A1* | 10/2005 | Wolber | G06F 9/546 |
| | | | 709/206 |
| 2005/0240663 A1* | 10/2005 | Wolber | G06F 9/546 |
| | | | 709/220 |
| 2007/0044144 A1 | 2/2007 | Knouse | |
| 2008/0256610 A1* | 10/2008 | Patrick | G06F 21/6245 |
| | | | 726/4 |
| 2009/0259715 A1* | 10/2009 | Xiao | G06F 9/541 |
| | | | 709/203 |
| 2010/0251262 A1* | 9/2010 | Rokicki | G06Q 10/107 |
| | | | 719/314 |
| 2010/0332604 A1* | 12/2010 | Mishra | H04L 67/26 |
| | | | 709/206 |
| 2012/0023116 A1* | 1/2012 | Wilkes | G06F 16/2452 |
| | | | 707/756 |
| 2013/0290524 A1* | 10/2013 | Liu | G06F 9/541 |
| | | | 709/224 |
| 2014/0006626 A1 | 1/2014 | Breiter | |
| 2014/0189681 A1 | 7/2014 | Bryan | |
| 2014/0201242 A1 | 7/2014 | Bakthavachalam | |
| 2015/0271121 A1* | 9/2015 | Wells | H04L 41/5003 |
| | | | 709/206 |
| 2016/0094498 A1* | 3/2016 | Xiao | H04L 41/12 |
| | | | 709/206 |
| 2016/0094510 A1* | 3/2016 | Xiao | G06Q 10/107 |
| | | | 709/206 |

OTHER PUBLICATIONS

McCool, Michael, "Parallel Pattern 7: Reduce", Dec. 4, 2009, 3 pages. Retrieved on Sep. 12, 2017 from http://www.drdobbs.com/architecture-and-design/parallel-pattern-7-reduce/222000718.

Cozzi, Patrick, "Parallel Algorithms", University of Pennsylvania, Spring 2012, 21 pages. Retrieved on Sep. 12, 2017 from http://cis565-spring-2012.github.io/lectures/02-01-Parallel-Algorithms.pdf.

"Oracle® Fusion Middleware Administering WebLogic Server for Oracle Exalogic Elastic Cloud 12c (12.1.3)", Oracle, Jul. 2014, 50 pages.

"Oracle® Fusion Middleware Administering WebLogic Server for Oracle Exalogic Elastic Cloud 12c (12.1.3)"; Chapter 3: "Using the WebLogic Replicated Store for WebLogic Server Messaging Services", downloaded from htttps://docs.oracle.com/middleware/1213/wls/WLEXA/rs.htm on Dec. 3, 2014, 19 pages.

"Oracle® Fusion Middleware Administering Server Environments for Oracle WebLogic Server 12.1.3", Oracle, Aug. 2015, 98 pages.

"Oracle® Fusion Middleware Administering Server Environments for Oracle WebLogic Server 12.1.3"; Chapter 6: "Using the WebLogic Persistent Store", downloaded from https://docs.oracle.com/middleware/1213/wls/CNFGD/store.htm on Dec. 3, 2014, 30 pages.

"Oracle WebLogic Server 12.1.3 is Released", Will Lyons, Jun. 26, 2014, downloaded from https://blogs.oracle.com/WebLogicServer/entry/oracle_weblogic_server on Dec. 3, 2014, 2 pages.

"Oracle Cloud Control Help for WebLogic Server 12c (12.1.3): Create Replicated Stores", downloaded from https://docs.oracle.com/middleware/1213/wls/WLACH/taskhelp/stores/ on Dec. 3, 2014, 2 pages.

"Block (data storage)", downloaded from https://en.wikipedia.org/wiki/Block_(data_storage) on Jun. 2, 2016, 1 page.

* cited by examiner

SYSTEM AND METHOD FOR SUPPORTING OBJECT-BASED SECURITY

CLAIM OF PRIORITY AND CROSS-REFERENCE TO RELATED APPLICATIONS

This application claims the benefit of priority to U.S. Provisional Application titled "SYSTEM AND METHOD FOR SUPPORTING OBJECT-BASED SECURITY", Application No. 62/549,343, filed Aug. 23, 2017 which is incorporated herein by reference.

FIELD OF INVENTION

Embodiments of the invention are generally related to software applications and application servers, and are particularly related to systems and methods for supporting object-based security in an application server environment.

BACKGROUND

Software application servers, examples of which include Oracle WebLogic Server (WLS) and GlassFish, generally provide a managed environment for running enterprise software applications. Recently, technologies have also been developed for use in cloud environments, which allow users or tenants to develop and run their applications within the cloud environment, and to take advantage of distributed resources provided by the environment.

Java Message Service (JMS) application programming interface (API) is an API usable in application server environments for sending messages between two or more clients. JMS is a messaging standard that allows application components to create, send, receive, and read messages, allowing communication between different components of a distributed application to be loosely coupled, reliable, and asynchronous.

Sone of the current JMS implementations utilize thread-based security in which a client establishes a connection to an application server and establishes a context/subject for the thread using client credentials. Further processing on the established thread utilizes the same context/subject.

However, thread-based security implementations can be ineffective where an application is operating in a multi-threaded environment or in an environment interacting with foreign environments which cannot be relied upon to inject proper credentials/context/subjects. In such situations in may be difficult of impossible to efficiently utilize thread-based security.

SUMMARY

In accordance with an embodiment, the present disclosure describes a system and method for providing an object-based security model for use with messaging services (e.g., JMS) in an application server environment. The application server environment may be a multi-tenant or single tenant environment. The object-based security model can overcome the limitations of prior thread-based security models. For example the object-based security model can overcome the limitations of using thread-based security models in applications operating in a multi-threaded environments or in an environment interacting with foreign environments which cannot be relied upon to inject proper credentials/context/subjects In accordance with an embodiment, the object-based security model causes a method call to use credentials stored in a security subject of a caller rather than credentials associated with a current thread. The object-based security model can be used for Java Naming and Directory Interface (JNDI) operations and JMS connection operations. For JNDI operations, the object-security model can be enabled to provide a security subject in an initial context for use by lookup calls directed to the initial context regardless of a security subject attached to a current thread of each lookup call. For JMS operations, the object-based security model can be enabled on a JMS connection factory via a security policy setting, and can be used to create a JMS connection. The JMS connection created from the JMS connection factory can be associated a security subject based on credentials supplied to create the JMS connection. The JMS connection can perform a plurality of JMS operations on different threads using the security subject. The object-based security model can be automatically enabled for JMS connection operations once the JMS is accessed using an OBS-enabled JNDI context.

These and other objects and advantages of the present invention will become apparent to those skilled in the art from the following description of the various embodiments, when read in light of the accompanying drawings.

DETAILED DESCRIPTION

Figure 1:
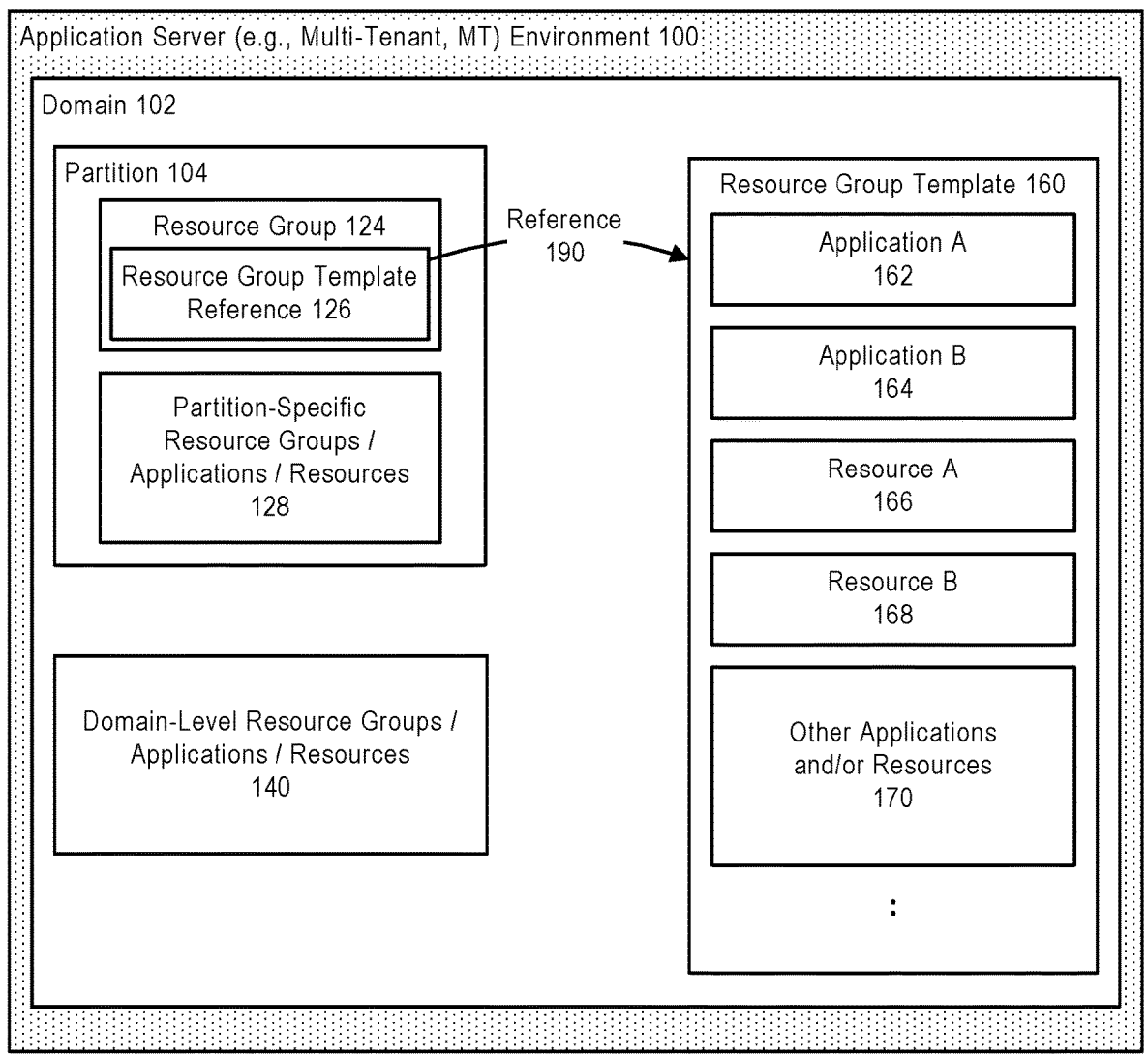
FIG. 1 illustrates a system for supporting multi-tenancy in an application server, cloud, or other environment, in accordance with an embodiment.

In accordance with an embodiment, described herein is a system and method for supporting messaging services in a partitionable environment for operating application software. In particular the present disclosure describes a system and method for object-based security for JMS that overcomes the limitations of prior thread-based security limitations. In a cluster, JMS components typically reside on different servers within that cluster, and can work together to enable communication between applications executing on the different servers, as well as between applications executing on different clusters within a partition. Further, under some circumstances it will be desirable to communicate across partitions, or between the domain level and partitions.

In a particular embodiment, the present disclosure describes a system and method for object-based security that overcomes the limitations of prior thread-based security limitations. The system and method may be applied to single of multi-tenant environments. The object-based security model will be described with respect to JMS in a multi-tenant environment. The system and method may be applied to single of multi-tenant environments. The system and method may also be readily adapted to provide security in other systems operating in multi-threaded environments or environments interacting with foreign environments which cannot be relied upon to inject proper credentials/context/ subjects.

In the following description, the invention will be illustrated, by way of example and not by way of limitation, in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. Functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Application Server (e.g., Multi-Tenant, MT) Environment

FIGS. 1-6 illustrate a system for supporting multi-tenancy in an application server, cloud, or other environment, in accordance with an embodiment. Such an environment is suitable for implementation of the system and method for providing an object-based security model (as described below and shown in FIGS. 7-9) for use with messaging services (e.g., JMS) described herein. Although, as described above, the object-based security model may also be implemented in other application server systems, either single or multi-tenant, where the features of the model are necessary or desirable. As illustrated in FIG. 1, an application server (e.g., multi-tenant, MT) environment 100, or other computing environment which enables the deployment and execution of software applications, can be configured to include and operate according to a domain 102 configuration that is used at runtime to define an application server domain.

The application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
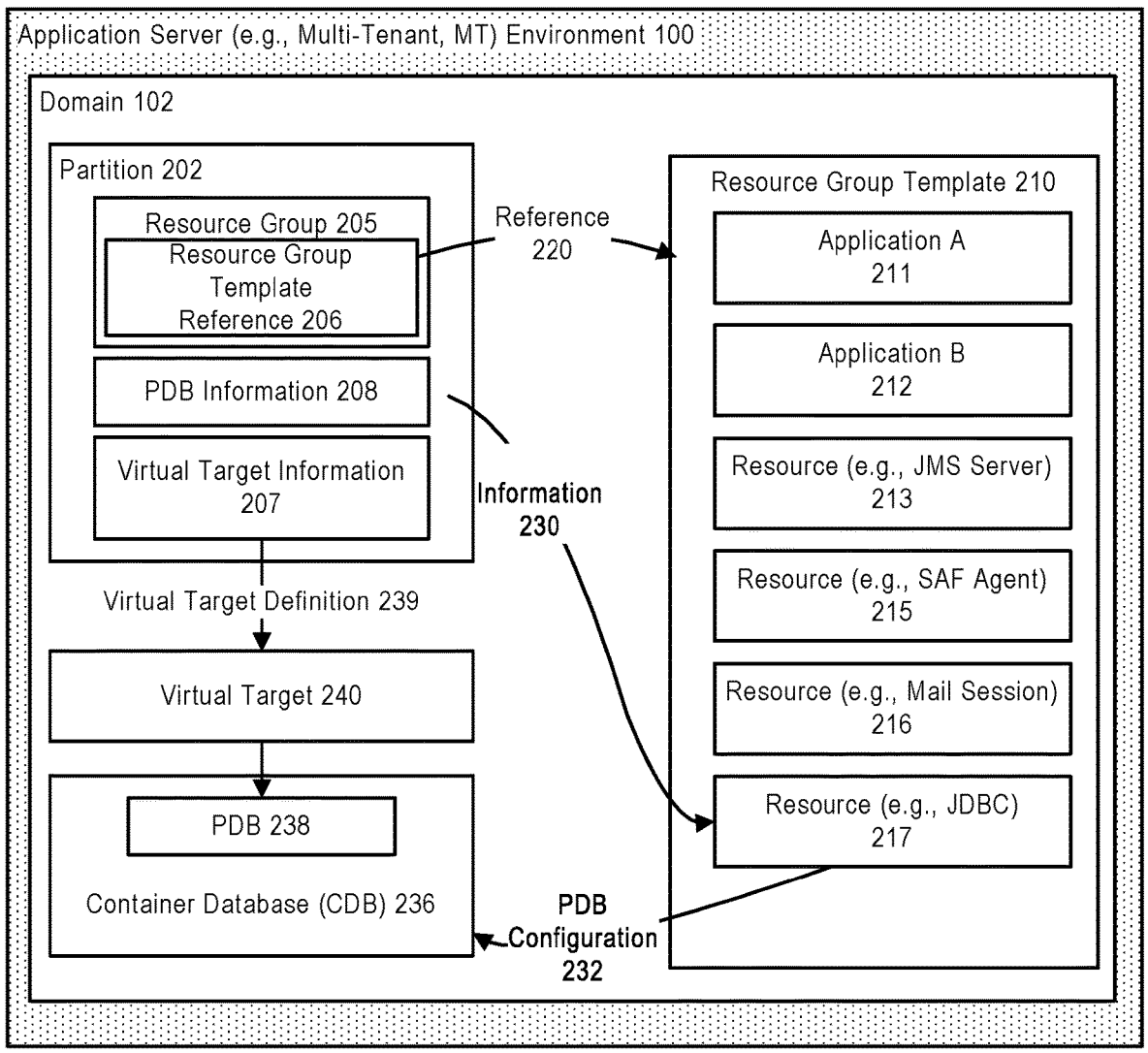
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment. As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217. In an embodiment, the JMS server 213 can implement the object-based security model as described below.

The resource group template illustrated in FIG. 2 is provided by way of example; in accordance with other embodiments, different types of resource group templates and elements can be provided. In accordance with an embodiment, when resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition. Further, foreign JMS server overrides contain property key values that can provide overrides for resource group templates.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
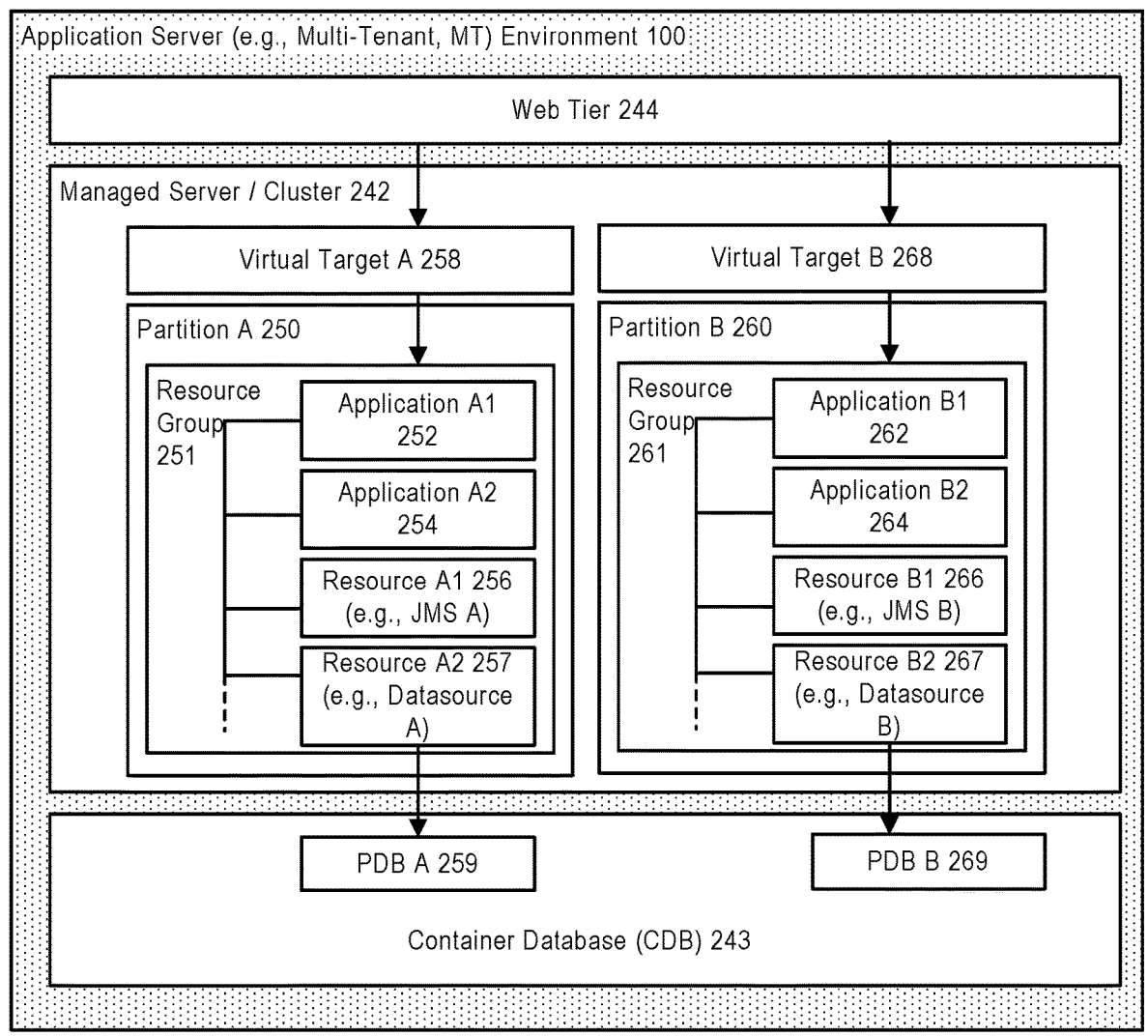
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment. A system configuration such as a config.xml configuration file, is used to define a partition, including configuration elements for resource groups associated with that partition, and/or other partition properties. Values can be specified per-partition using property name/value pairs.

A plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

Each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, other types of multi-tenant or non-multi-tenant databases can be supported, wherein a particular configuration can be provided for each partition, for example through the use of schemas, or the use of different databases.

A resource is a system resource, application, or other resource or object that can be deployed to a domain of the environment. For example, a resource can be an application, JMS, JDBC, JavaMail, WLDF, data source, or other system resource or other type of object that can be deployed to a server, cluster, or other application server target.

A partition is a runtime and administrative subdivision or slice of a domain that can be associated with a partition identifier (ID) and configuration, and can contain applications and/or refer to domain-wide resources through the use of resource groups and resource group templates. Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

Each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

A partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates. Further, foreign JMS server overrides contain property key values that can provide overrides for resource group templates. Upon startup, the system can use the information provided by the configuration file to generate partition-specific configuration elements for each resource, from the resource group template.

A resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a software as a service (SaaS) use case, various partition-level resource groups can refer to domain-level resource group templates; while in a platform as a service (PaaS) use case, partition-level resource groups can be created that do not refer to resource group templates, but instead represent applications and their related resources that are to be made available within that partition only.

Resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

A resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level. Partition level configuration can instead be specified in the resource group template through the use of macros, other overrides, or property name/value pairs, or, for example, through the use of foreign JMS server overrides which contain property key values that can provide overrides for resource group templates.

A particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

In a multi-tenant environment, such as a multi-tenant (MT) application server environment, a tenant is an entity that can be represented by, or otherwise associated with, one or more partitions and/or one or more tenant-aware applications. For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

The system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

The system enables users to deploy applications that are explicitly written to be tenant-aware, so that application developers can obtain the tenant ID of a current tenant. The tenant-aware application can then use the tenant ID to handle multiple tenants that are using a single instance of the application. For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Figure 4:
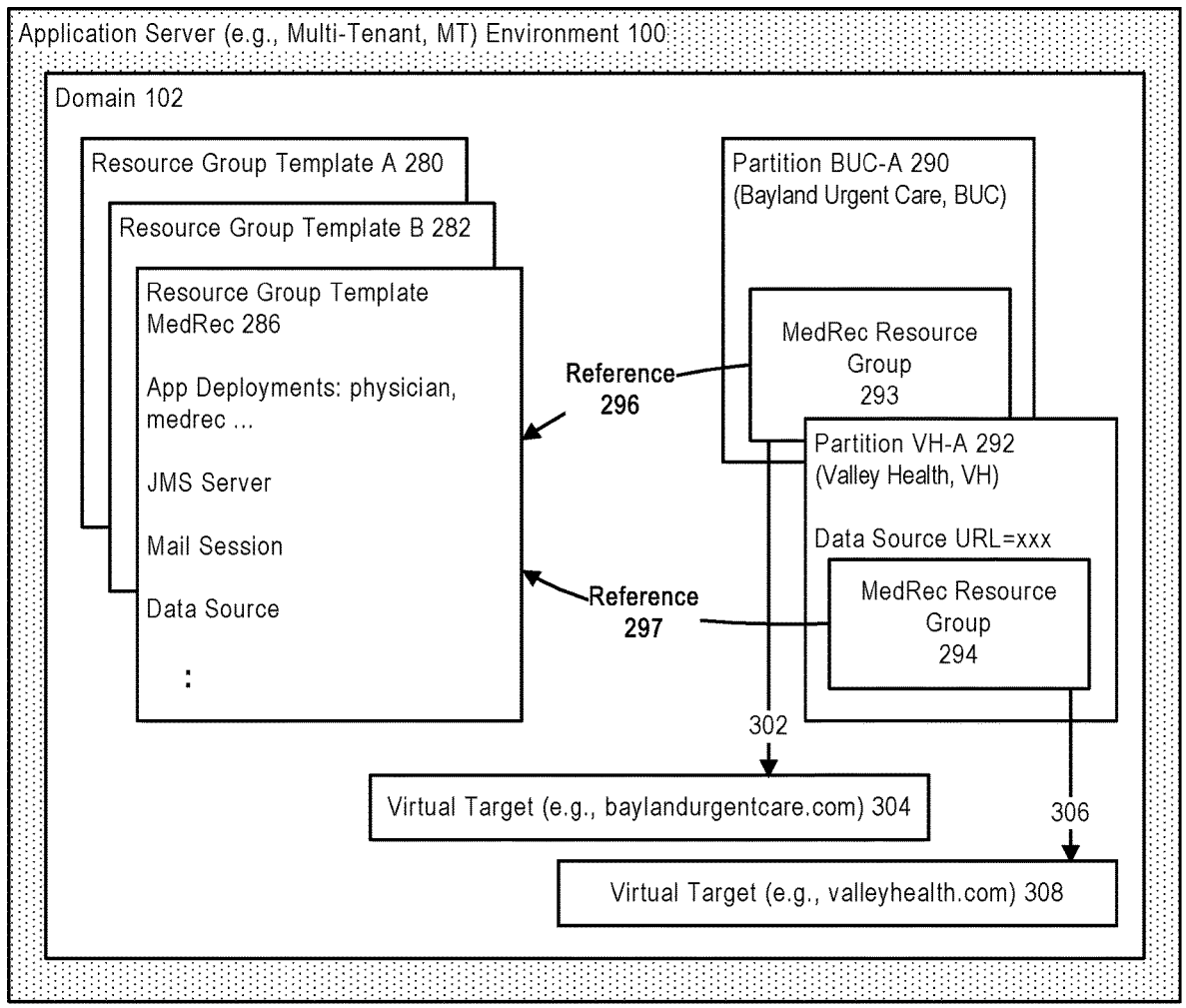
FIG. 4 illustrates an exemplary use of resource group templates, in accordance with an embodiment.

FIG. 4 illustrates a domain configuration for use with an exemplary multi-tenant environment, in accordance with an embodiment. Applications can be deployed to a resource group template at the domain level, or to a resource group that is scoped to a partition or scoped to the domain. Application configuration can be overridden using deployment plans specified per-application, or per-partition. Deployment plans can also be specified as part of a resource group. When the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
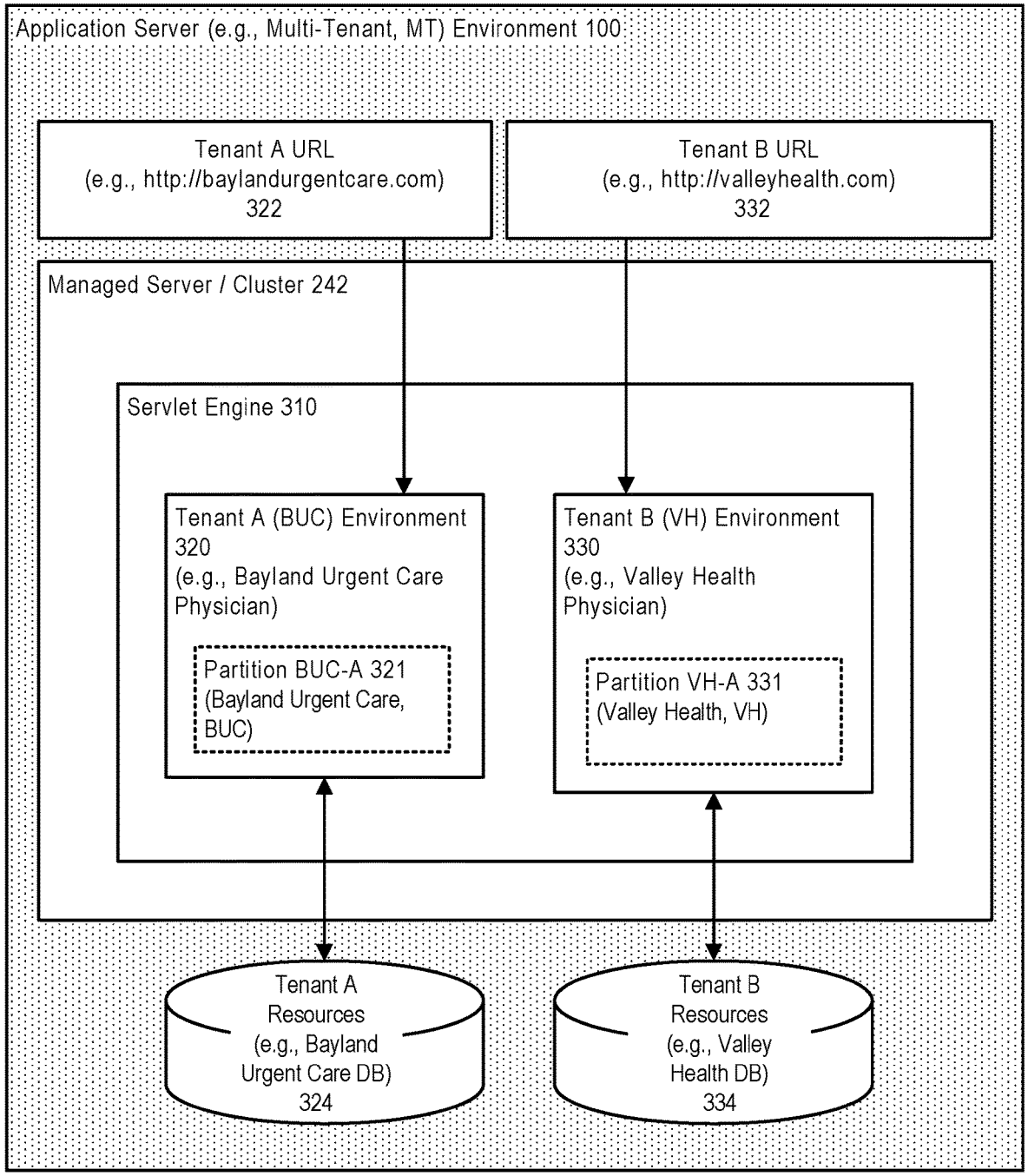
FIG. 5 illustrates an exemplary multi-tenant environment, in accordance with an embodiment.

FIG. 5 further illustrates an exemplary multi-tenant environment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

Each partition 321, 331 can define a different virtual target on which to accept incoming traffic for that tenant environment, and a different URL 322, 332 for connecting to the partition and to its resources 324, 334, including in this example either a Bayland urgent care database, or a valley health database respectively. The database instances can use compatible schemas, since the same application code will execute against both databases. When the system starts the partitions, it can create the virtual targets and connection pools to the respective database instances.

Messaging Components for Use in a Partitionable, Multi-Tenant Environment

Described herein is a system and method for implementing a messaging service that can support cluster targeting in a partitionable, multi-tenant environment for operating software applications. In embodiments the messaging service implements an object-based security model as described herein. Messaging services will be described hereinafter in the context of Java Message Service (JMS), including exemplary deployments, features and configurations of JMS. However, one skilled in the art will appreciate that the description of JMS is merely exemplary, that JMS is merely one type of messaging service and that embodiments are intended to be applicable to any messaging service usable within a partitionable environment for operating software applications. Further, one skilled in the art will appreciate that a messaging service is merely one type of service, and that embodiments are intended to be applicable to other services, such as a transaction manager, usable within a partitionable environment for operating software applications.

JMS services comprise core JMS components including JMS servers, JMS system modules, JMS application modules, JMS Java clients, C clients and .NET clients, public helper APIs, and path services. JMS services further comprise internal components such as a dispatcher, front-end, back-end and messaging kernel. Further, store-and-forward (SAF) services comprise agents for both JMS SAF and the web services reliable messaging (WSRM) for WebLogic Java API for XML-based remote procedure call (JAX-RPC) web services implementation, and messaging integration comprises integration components for arbitrary JMS providers including messaging bridges, JMS pools, and foreign JMS servers.

Figure 6:
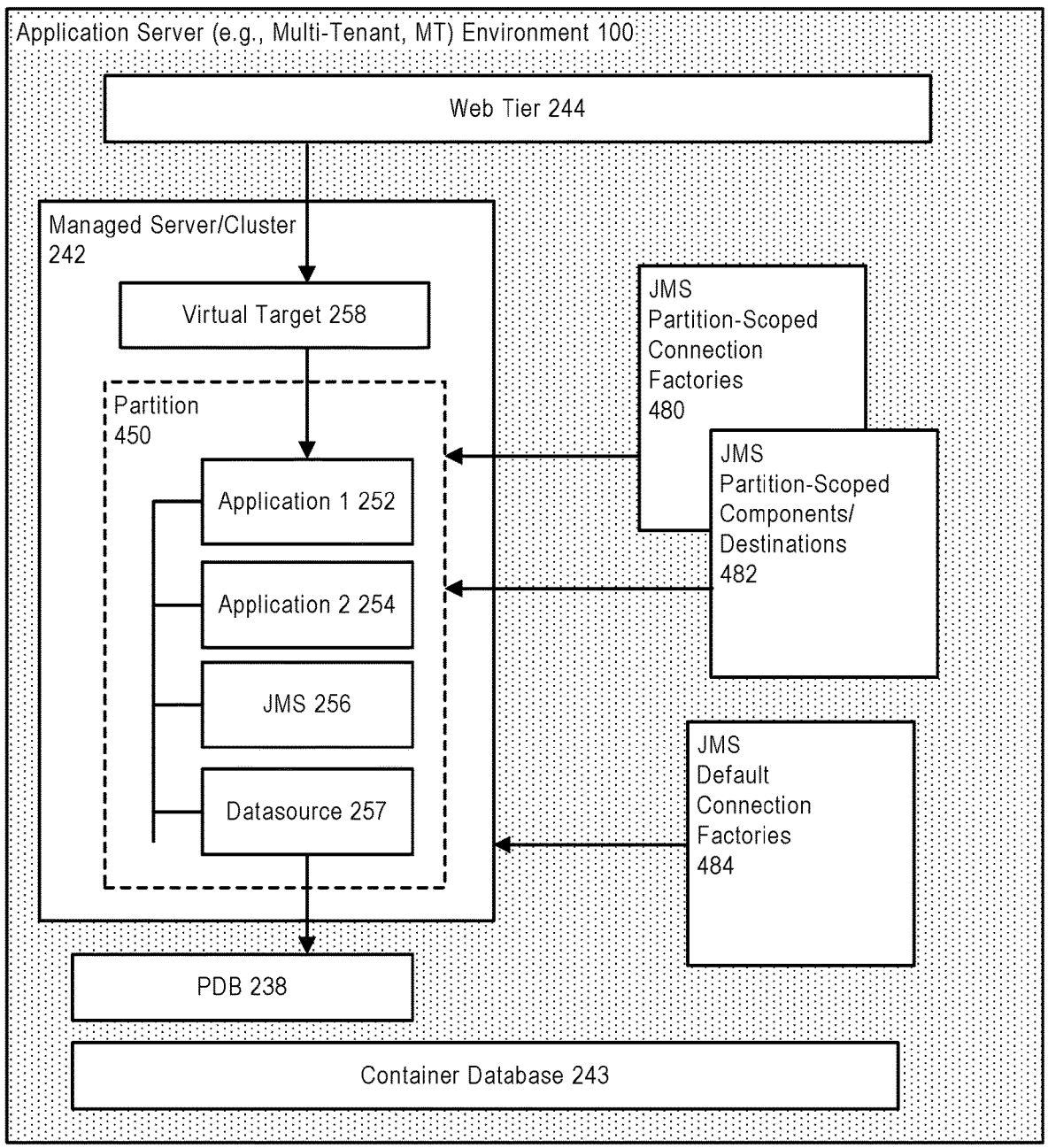
FIG. 6 illustrates messaging in a multitenant application server environment, in accordance with an embodiment.

FIG. 6 illustrates messaging in a multitenant application server environment, in accordance with an embodiment. JMS messaging components 480, 482 for use in a partitionable, multi-tenant environment, including JMS servers, path services, SAF agents, messaging bridges, JMS foreign server, JMS system modules, and JMS application modules, can be deployed in a partition through resource groups and resource group templates. JMS wrapper/pools can be referenced by an application (e.g., a Java EE application) within a partition using resource references. Partitions can be isolated with respect to one another if a resource group template is referenced by partitions on multiple clusters.

JMS resources can be defined within a resource group template or a resource group and instantiated within a partition to support SaaS and consolidation use cases. JMS components are partition scoped, exist in an isolated JNDI name-space, use partition scoped runtime/configuration MBeans and use isolated persistent storage. JMS connection factories and their child resources are associated with the partition for which they are configured. Default connection factories 484 are deployable to the domain and are available to applications within partitions. Default connection factories are scoped (isolated) to the domain level or to their partitions. They are not directly shared across partitions except that all custom factories (custom and default) are available across partitions using the "domain:" and "partition:" JNDI name prefix, or using URL locators that resolve to the different location.

In accordance with an embodiment, the operations, administration and management (OA&M) service automatically decorates configuration and deployment MBean names with their local partition name, or provides a mechanism for JMS components to do so. The core OA&M, deployment, networking, security and diagnostics services are partition aware by default. For example, when a logger logs a message, the partition ID of the current thread will show in a supplemental attribute of a log message unless the log message is specifically marked as "exclude_partitioned". Core service callbacks, including OA&M, JNDI, diagnostics, and deployment service callbacks, include the local partition ID on the callback thread.

Work manager instances, once created, are associated with a particular partition and run jobs with the partition ID of that partition on the execute thread. If a work manager name exists at the domain level, a findOrCreateWorkManager( ) call from a partition context does not return the global work manager with that name if a local work manager with that name does not exist. Rather, a partition-scoped work manager with that name is created. A timer manager delegates partition association to the work manager instance that is associated with the timer manager.

Enterprise Javabeans (EJBs), servlets, and message driven beans (MDBs) are fully partitioned. For example, a particular instantiated partition scoped MDB or EJB bean will have the partition ID of its host partition on the current thread.

Data sources and WebLogic remote method invocation (RMI) and/or EJB smart stubs, including JMS connection factory stubs, are associated with the partition from which they are obtained, and do not change their partition based on the current partition on the current thread. APIs are provided for obtaining the partition ID of the current thread, for overriding the partition ID of the current thread with a different partition ID and for obtaining the partition of a smart stub.

A client or partition is able to communicate with one or more destinations on multiple partitions within the same cluster, within different clusters, or within different domains, and can interoperate with previous versions of application servers (e.g., WebLogic servers) that are not executing within partitioned environments. For example, old clients are able to send messages to a particular partition, and a partitioned application will be able to send messages to an application server that is executing in a non-partitioned environment.

Domain level JMS resource configurations, JMS system resources and JMS modules embedded in deployable modules are supported at the domain level for applications built for non-partitionable or legacy environments.

As mentioned above, in accordance with an embodiment, JMS resources are available for applications for use in partitionable, multi-tenant environments at the partition level via resource group templates or resource groups. JMS resources, such as connection factories, destinations, message bridges and path services are partition scoped, with each resource either belonging to the domain or a particular partition. A resource can exist in multiple partitions with the same JNDI name. An application that uses the correct URL when it creates an initial context to the domain or partition will access the correct resources via JNDI lookup operations.

Persistent application data that a JMS component holds are stored in persistent storage, such as a file store, replicated store or JDBC store. Each partition includes an instance of a file store and replicated store so that the data are in different locations in the file system if configured properly, and JMS applications can achieve isolation of application data, system resources, as well as security, between partitions. Each partition can choose to use a different PDB instance in the same database when using a JDBC store.

A JMS component ensures that system resources, such as threads and memory, are accounted for under the right partition. The JMS component replies on some of the core services to provide object-based partition association.

In accordance with an embodiment, core messaging components include JMS servers, SAF agents, and path services. A JMS server can include, for example, a WebLogic server service that provides messaging capability via Java EE standard interfaces and additional WebLogic extensions. A SAF agent can provide a store-and-forward service to WebLogic JMS. A path service is a singleton service in a cluster that provides persistent routing data for JMS server and SAF agent distributed destination members. Each partition includes a path service in each cluster and an MBean legal check prevents a path service from being configured in more than one resource group in a partition in the same cluster.

The core messaging components are deployable in a partition via resource groups and resource group templates, and inherit the target of the resource group and partition to which they belong. An exception is thrown if a resource within a resource group has its own target. For non-partitionable environments, or other legacy configurations, configuration entities are directly targeted to a server, a cluster, or a migratable target. In accordance with an embodiment, a migration tool can be used to null out the targeting of existing resources when migrating the resources to a partitionable, multi-tenant environment, for example from a non-partitionable environment (e.g., a legacy environment).

A cloned instance of a resource includes a name that is automatically decorated with the local partition name. Instance names can be generated based on configuration MBean names, which are automatically decorated with the current partition name by the OA&M service. Cluster targeted JMS server and SAF agent names embed the name of an application server (e.g., a WebLogic server). For further disambiguation some internal artifacts, such as XA resources, are decorated with the current domain name.

In accordance with an embodiment, messaging includes separate configuration modules that can be targeted at clusters or individual servers, and optionally associated with particular JMS servers and SAF agents within this targeting scope via sub-deployments. There are two types of modules: system modules which can be referenced from the config.xml file of a domain and configured via MBeans and console, and application modules which can be embedded within an application.

JMS module artifacts, such as JMS connection factories, JMS server distributed and singleton destinations, SAF agent imported destinations, and foreign JMS server references, can be configured at a global level as well as at a partition level. Once configured within a partition, the JNDI names for the module artifacts are registered in the JNDI namespace that corresponds to the partition of the JMS module. In accordance with an embodiment, the namespace for system modules is the global JNDI namespace, while the JNDI namespace for application modules is the JNDI name space of the component. The sub-deployment targets of a JMS module are in the same partition as the JMS module itself.

A Java EE application, such as a message driven bean (MDB), deployed in a partition can access domain level JMS resources, or partition level JMS resources in the same partition or in a different partition in the same cluster, a different cluster or a different domain generally via JNDI. JMS resources at the domain level and partition level are isolated from each other even if they have the same name.

A physical JMS system module file is referenced by one resource group template in one domain. Similarly, for the non-templated consolidation use case, a physical JMS system module file is referenced by one resource group.

In accordance with an embodiment, internal OA&M configuration MBeans for these resources may have names that are automatically decorated with partition names by the OA&M component, but in general, public configuration MBeans are not so decorated. Regardless, the entity names are unique within their scope within a server when the configuration callbacks get into the JMS layer. In some embodiment, partition information is stripped from the name of a JMS runtime MBean that derives its name from the name of an internal configuration MBean that has name decoration.

Some module artifacts can include configurable attributes, including credentials and URLs, customized on a per partition basis. Per partition customization can be achieved by a macro substitution mechanism available via partition properties for artifacts within a resource group template and does not apply to configurable artifacts in a JMS module file that is referenced from a JMS-system-resource or an add-deployment in the resource group template. Per partition customization can also be achieved by an MBean that handles customization of PDB configurations. Per partition customization can also be achieved by an application deployment plan that overrides some of the application deployment settings, for example via an MBean mechanism. Per partition customization can also be achieved via foreign JMS server overrides which contain property key values that can provide overrides for resource group templates.

Default connection factories can be enabled and disabled on a per server basis. Once enabled on an application server (e.g., a WebLogic server) default connection factories are available in all partitions running on that application server. Once disabled, the default connection factories are not available in any partitions on the server.

Messaging provides asynchronous communication between application components. Communication can cross the boundary of partitions on the same cluster, different clusters and even different domains. An arbitrary messaging thin Internet Inter-ORB Protocol (IIOP) client, thin T3 client, thick/full Java client or non-partitioned server-hosted application client is able to access a partition-scoped JMS resource that is on a remote application server (e.g., WebLogic server). In addition a server-side application from one partition can access JMS resources of another partition on the same server, same cluster, and same domain.

JMS client connections can be permanently associated with the partition from which they obtain their connection factory, and do not change their partition based on what is on the current thread. When JMS pushes messages or exceptions to an async listener, the local partition ID of the listener will be resumed, rather than the partition of the destination.

A JMS application is able to access a JMS resource that is running in a different JVM or cluster via the WebLogic T3 protocol. The application needs to supply a partition URL besides a JNDI provider URL which establishes the initial context. For example, the application can supply a partition URL such as (1) t3://virtualhostname:port, which requires configuring virtual hosts, (2) t3://host:portURI, where the URI is often configured to be the same as the partition-name, or (3) via t3://host:port, where the port has been dedicated for use by a specific partition. A virtual host need not be configured to support the latter two methods.

For interoperability, an application that is not designed for running in a partitionable, multi-tenant environment is able to access a JMS resource in a partition by using method (3). Further, a JMS application in one partition or at the domain level is able to access a JMS resource in a different partition that is running on the same JVM without requiring the provider URL.

Object-Based Partition Association

In accordance with an embodiment, in a partitionable, multi-tenant environment, JMS uses an object-based partition model rather than a thread-based partition ID association model alone because some JMS features require one thread to work with different application resources that are potentially in different partitions, clusters and even domains. For example, a messaging bridge may receive messages from a destination in one partition and forward them to a destination in another domain. Unless the partition ID is associated with JNDI context and JMS connection object-based, the messaging bridge has to switch partition ID on a per call basis. Further, it is common that a JMS application may cache a JMS object and uses it in a thread that is different from the one that establishes the initial context. As result, JMS connection factories that are obtained from a particular partition remain permanently associated with that partition regardless of the partition ID that is on the current thread.

JNDI initial contexts use a thread-based partition ID pattern, yet messaging internals, messaging applications, and even non-message applications very likely need them to use an object-based partition ID association approach similar to the one used for messaging. For example, when a context is created for a virtual host or a URL with a partition name, the context object should remember the partition ID so that all subsequent lookups and bindings are done within the context of the partition. This stickiness needs to remain even if the context is used by a different thread than was used to create the context.

In addition, context creation should not change the partition ID of the current thread. An object-based initial context can simplify messaging internals, and can ensure that customer applications that directly use contexts for messaging and non-messaging purposes will work correctly when multi-threading or when attempting cross-partition communication. This eliminates the need for clients and internal code to manually ensure that the right partition is on a thread that happens to work with more than IC to more than one partition. It can also eliminate the need for clients to move a partition from thread to thread even when it works with a single IC, otherwise the lookup may mistakenly use a null or a local partition that is on the current thread).

In accordance with an embodiment, loggers can be provided with an object-based partition ID option. This can reduce the need to push/pop a partition ID in messaging paths that are associated with a particular partition, but may be called using threads from multiple different partitions.

Object-Based Security

In accordance with an embodiment, a system and method provides a messaging service in a multitenant application server environment wherein the system and method supports object-based security.

Current JMS implementations (e.g., WebLogic JMS) utilize a thread-based security model based on a security subject attached to a caller's thread. A caller can be a client application that request resources from the multitenant application server environment. For example, a caller can be a JMS producer or a JMS consumer.

This model transparently handles simple single-threaded client-side use cases as well as Java EE applications running on a WebLogic server, but can require additional special case handling in multi-threaded clients or non-Java EE server side code.

In accordance with an embodiment, the present disclosure describes a new object-based security model. In the object-based security model, a security subject is used to create a JNDI Initial context or JMS connection can be attached to the created initial context or JMS connection such that all subsequent operations can be performed on behalf of the same security subject.

In accordance with an embodiment, credentials used to create the security subject can be specified either at a JNDI initial context level, or a JMS connection factory level. Alternatively, the credentials can be obtained from a current thread to create the security subject, which is then attached to the JNDI initial context or a JMS connection factory. Thereafter all subsequent operations on the JNDI initial context or the JMS connection can be performed on behalf of the attached security subject.

In accordance with an embodiment, credentials can be obtained to create a security subject in one of the following ways: (1). injecting credentials via properties on an initial context; (2). injecting credentials via properties on a connection factory; (3) getting credentials from a current thread and applying them from that point on; and (4). passing credentials in as part of parameters for creating a connection call.

In accordance with an embodiment, under the object-based security model, credentials can be associated with a JNDI context or JMS connection/context instead of a thread. The object-based security model provides a JNDI context with object-based security capability (OBS-IC); a JNDI initial context factory with object-based security capability (OBS-ICF); and a JMS connection factory with object-based security capability (OBS-JMS).

Figure 7:
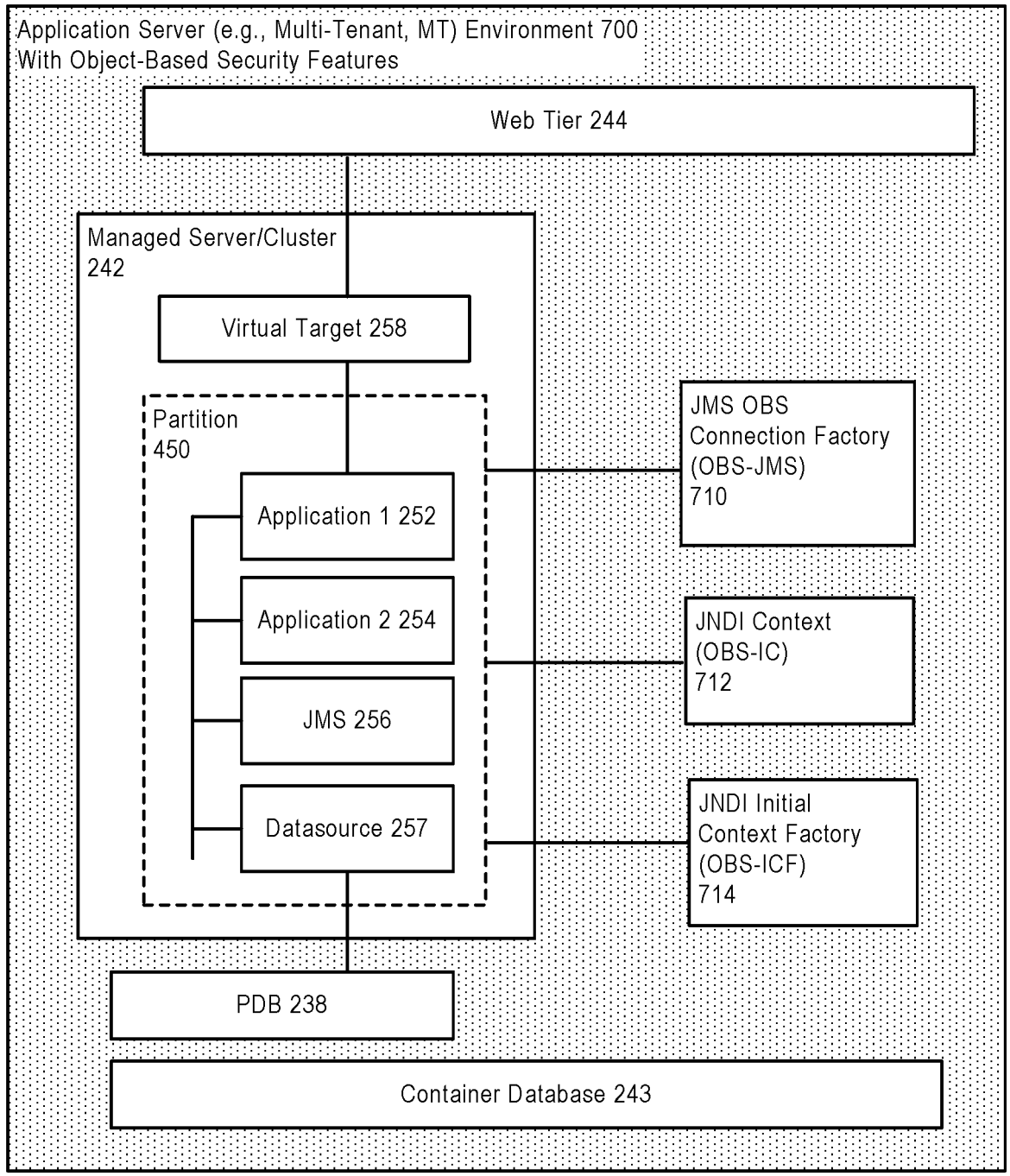
FIG. 7 illustrates a system for supporting object-based security features for use with messaging services in a multi-tenant application server environment.

FIG. 7 illustrates a system for supporting object-based security features for use with messaging services in a multi-tenant application server environment.

As shown in FIG. 7, an application server environment with object-based security 700 can include one or more of a JMS object-based security connection factory (OBS-JMS) 710, a JNDI context with object-based security (OBS-IC) 712, and a JNDI initial context factory with object-based security (OBS-ICF) 714. These elements can be used to create JMS connections or JNDI initial contexts.

The use of object-based security allows integrating JMS into multithreaded environments and foreign environments, for example, application servers outside of a WebLogic environment.

Such application servers generally use standard Java EE APIs to speed up access to remote vendors. However, the application servers/adapters create their JMS objects (e.g., security subjects) ahead of time and randomly decide which thread can use the objects. As such, it is difficult to determine whether a particular thread has an appropriate security subject on it.

Accordingly, relying on a thread-based security model can be challenging in multi-threaded environments and foreign environments. The result of relying on a thread based security model in these environments is that a random subject or no subject would appear on a thread.

In accordance with an embodiment, a system and method for providing an object-based security model can ensure that an appropriate security subject is applied. The object-based security model can be useful in use cases such as arbitrary JMS resource adapters, and multi-threaded client code.

In contrast, a thread-based security semantic can be problematic with such use cases as it requires specialized code changes to capture a thread-based security context and transfer it between threads, which can be a potentially complex or even impractical task. The object-based security model can eliminate the need for these specialized code changes.

In accordance with an embodiment, the object-based security model can support JNDI operations and JMS connection operations, and can work with both areas together or separately with either area.

In accordance with an embodiment, the object-based security model can be enabled for JNDI operations when an application uses an initial context factory that is enabled with object-based security. Any lookup call directed to an initial context created from the initial context factory can use credentials specified for the initial context regardless of a security subject attached to a current thread associated with the lookup call. The initial context can be further fine-tuned by one or more JNDI environment properties.

In accordance with an embodiment, for JMS connection operations, object-based JMS security can be enabled on a JMS connection factory via a security policy setting (abbreviated as OBS-JMS). The policy setting can determine whether a thread-based behavior is desired or whether one of a plurality of object-based-security behaviors is enabled. When using an OBS-JMS enabled connection factory, a JMS connection created from the JMS connection factory can be associated with a security subject; credentials (username/password) optionally supplied to create the JMS connection call can be used when determining a security subject.

In accordance with an embodiment, the JMS connection can perform all JMS operations under the security subject associated with the JMS connection.

By default, object-based-security-JMS (OBS-JMS) is enabled once JMS is accessed using an OBS-enabled JNDI context. In addition, OBS-JMS behaviors can be enabled or fine-tuned by one or more JMS connection factory configuration attributes.

Security semantics for enabling the object-based security features work with JMS features and extensions. For the use cases where the features are not needed, thread-based security behaviors remain available even if the OBC initial connection factory (ICF) or/and OBS-JMS is enabled, which means that new configurations or JNDI properties will be ignored. In some cases where the security semantics cannot be ignored and will not work, an exception can be be thrown when an application uses an OBS-enabled ICF and OBS-JMS enabled CF.

Figure 8:
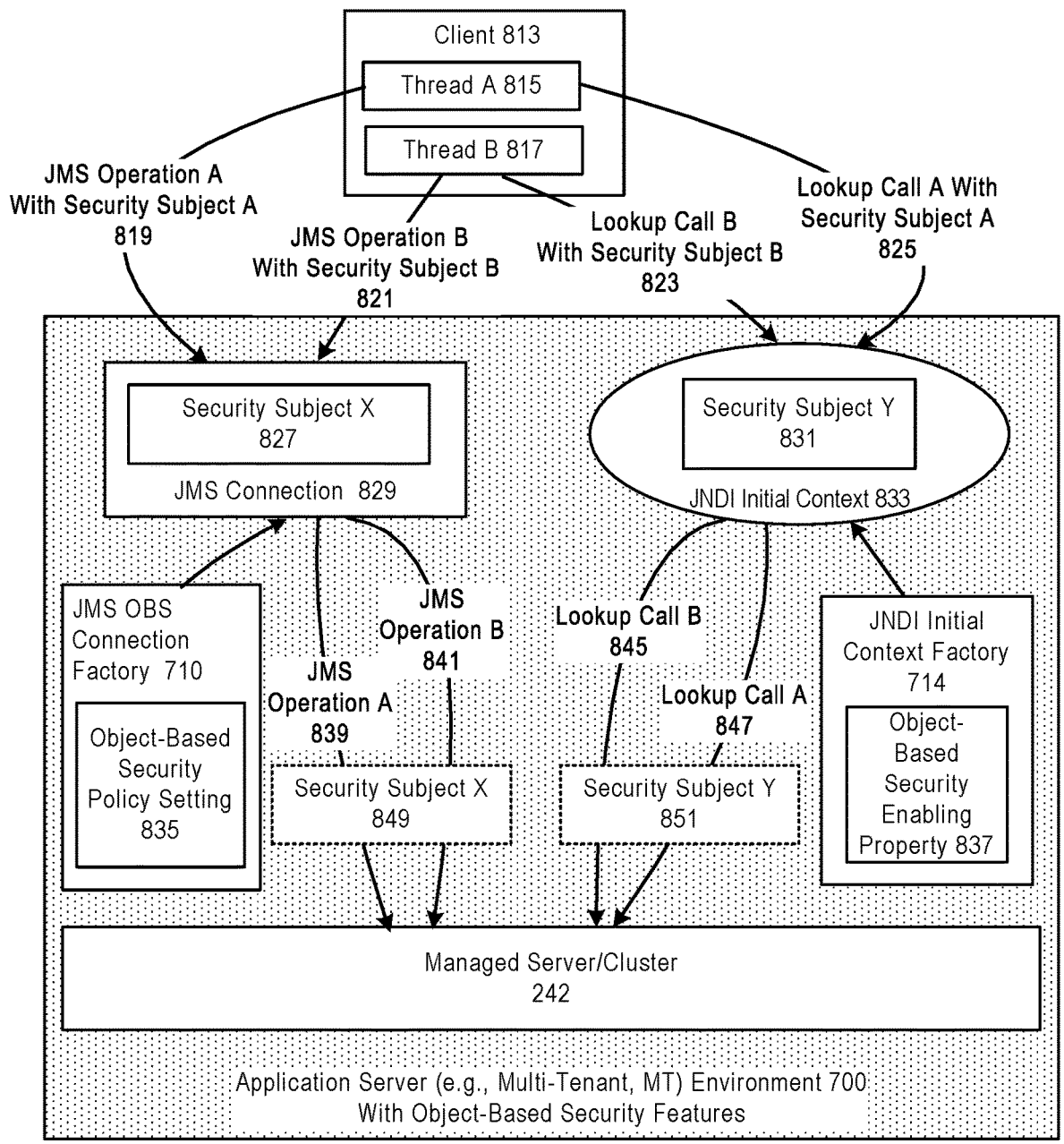
FIG. 8 further illustrates a system for supporting object-based security features for use with messaging services in a multi-tenant application server environment.

FIG. 8 further illustrates a system for supporting object-based security features for use with messaging services in a multi-tenant application server environment.

As shown in FIG. 8, each of the JMS OBS connection factory 710 and the JNDI initial context factory 714 can include a property for enabling object-based security features.

For example, in the the JMS OBS connection factory, an object-based security policy setting 835 is provided, and in the the JNDI initial context factory 714, an object-based security enabling property is provided. The enabling property in each factory enables the application server environment 700 to support the object-based security model for both JNDI operations and JMS connection operations.

In accordance with an embodiment, a JDNI initial context 833 can be created from the JNDI initial context factory that has been enabled with object-based security features, and can include a security subject Y 831.

In accordance with an embodiment, a security subject as used herein is an object that represents a grouping of related information for a single entity, such as a person. Such information includes the subject's identities as well as its security-related attributes, for example, passwords and cryptographic keys. A security subject can have multiple identities, each of which is represented as a principal within the security subject. Principals can bind names to a security subject.

For example, a security subject that is a person, Alice, can have two principals: one which binds her name on her driver license to the security subject, and another which binds her social security number on her student identification card to the security subject. Both principals can refer to the same security subject even though each has a different name.

A security subject can own security-related attributes (credentials). Sensitive credentials that require special protection, such as private cryptographic keys, are stored within a private credential set. Credentials intended to be shared, such as public key certificates or Kerberos server tickets are stored within a public credential set.

In accordance with an embodiment, credentials for security subject Y can be provided by a current thread used to create the JNDI initial context 833, or be anonymous if no credentials are provided when the JNDI initial context 833 is created.

In accordance with an embodiment, once the JNDI initial context 833 is created with the security subject (e.g., security subject Y), lookup calls 823, 825 directed to the JNDI initial security context on different threads 815, 817 from a client 813 can use the security subject in the JNDI initial context regardless of a security subject attached to a current thread of a lookup call.

Therefore, as shown in FIG. 8, lookup call A 847 and lookup B 845 use the same security subject (e.g., security subject Y) despite each lookup has its own security subject.

Similarly, for JMS operations, a JMS connection 829 can be created from the object-based-security-enabled JMS connection factory 710, and can be associated with a security subject (e.g., security subject X 827) that is based on credentials supplied to create the JMS connection.

Once the JMS connection is created, subsequent JMS operations 839, 841 on different threads 815, 817 from the client 813 can use the same security subject (e.g., security subject X 849), even though each JMS operation 819, 821 has its own security subject.

Figure 9:
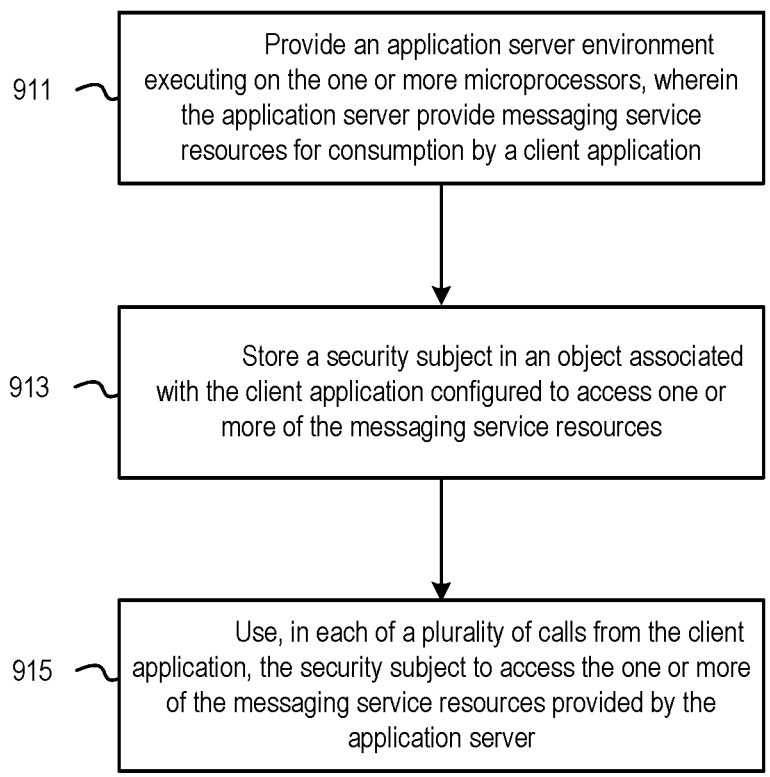
FIG. 9 illustrates a method for supporting object-based security features for use with messaging services in a multi-tenant application server environment.

FIG. 9 illustrates a method for supporting object-based security features for use with messaging services in a multi-tenant application server environment.

As shown in FIG. 9, at step 911, an application server environment executing on the one or more microprocessors is provided, wherein the application server provides messaging service resources for consumption by a client application.

At step 913, a security subject is stored in an object associated with the client application configured to access one or more of the messaging service resources.

At step 915, each of a plurality of calls from the client application uses the security subject to access the one or more of the messaging service resources.

An Example Implementation

The example implementation below uses Oracle WebLogic server as example. It would be evident to those skilled in the art that the object-based-security model can readily be implemented in other types of application servers.

The object-based security model can provide options for a JNDI initial context to support object-based security semantics and for a JMS connection factory to support object-based security semantics for WebLogic JMS clients.

OBS JNDI InitialContext Security Semantics

JNDI behaviors for the object-based security model can be specified when creating a javax.naming.InitialContext, by specifying a Context.INITIAL_CONTEXT_FACTORY" property with a value "weblogic.jms.WLInitialContextFactory".

When this initial context factory is used without any other optional OBS-IC specific properties, OBS-IC is enabled, and OBS-JMS is also enabled for all JMS connection factories that are looked up using an OBS-IC enabled context, regardless if the JMS connection factories are OBS-enabled explicitly or not.

JNDI behaviors for the object-based security model can also be specified by setting a WLJMSOBSContext.SECURITY_POLICY property to one of the following:

(1) ObjectBased default): Object based security is enabled for all initial context (IC) operations. When no credential is provided when an IC is created, anonymous credentials can be used.

(2). ObjectBasedHybrid: Object based security is enabled for all IC operations. When no credentials are provided when an IC is created, credentials on a current thread when the IC was created can be used.

JNDI behaviors for the object-based security model can also be specified by setting the property "WLJMSOBSContext.FORCE_JMS_OBJECT_BASED_SECURITY". The setting can be used to determine whether the OBS-JMS is forced to be enabled.

When the property is set to true (default): the OBS-JMS is forced to be enabled when a JMS CF obtained using this context does not enable such behavior explicitly. This can force the enablement of the same behavior as the ObjectBasedDelegated JMS CF behavior described below. If the JMS CF already enables OBS (ObjectBasedDelegated, ObjectBasedAnonymous and ObjectBasedThread), the system can maintain the CF's setting.

When the property is set to false: The OBS-JMS behavior can be determined by the JMS CF's setting.

JNDI behaviors for the object-based security model can also be specified by setting the property "WLJMSOBSContext.THREAD_SUBJECT_CHANGE_ENABLED". The setting can be used to determine whether an initial context changes a security subject on a current thread. When the property is set to true, the security subject on the current thread will change when credentials of the initial context are not anonymous. When the property is set to false (default), the initial context will not change the security subject on the current thread. The OBS-ICF can throw a checked exception if an unexpected value is supplied for the property. If any of the OBS specific properties is used with a standard WL ICF (weblogic.jndi.WLInitialContextFactory), the setting can be ignored.

An object-based security InitialContext implements javax.naming.Context, and supports calls for standard lookups for string values, including looking up sub-contexts, standard lookupLink of a string value, and list.

If a standard lookup, lookupLink, or a list call returns a context, the context can be an OBS initial context, and can have the same security subject as a parent context. An exception can be thrown on any other calls (e.g., a bind call).

Object-based JMS ConnectionFactory (CF) Security Semantics

Object-based JMS CF behavior is enabled on a per connection factory basis by an attribute on the JMSConnectionFactoryBean. The setting specifies whether object-based security is enabled and which specific subject can be used for object-based security when no username/password is supplied when the connection/context is created.

The options of the SecurityPolicy attribute are:

(1). ThreadBased (default): The option defines a thread-based security model unless WLContext.FORCE_JMS_OBJECT_BASED_SECURITY is set to true, which enables ObjectBasedDelegated behaviors.

(2). ObjectBasedDelegated: This option enables OBS-JMS, and delegates to credentials in an initial context unless a username/password is explicitly provided in a createConnection/Context call.

(3). ObjectBasedAnonymous: This option enables OBS-JMS, and uses anonymous credentials unless credentials (username and/or password) are explicitly provided in a createConnection/Context call.

(4). ObjectBasedThread: This opiton enables OBS-JMS, and uses a security subject that was on a thread when a connection/jms-context was created, unless credentials (username and/or password) are explicitly provided in a createConnection/Context call.

The attribute can be dynamically changed, but after such change an application needs to perform another lookup in order for the new setting to take effect. Callback threads will continue to have the security that was on the thread when a callback was registered.

Interaction with WL JMS Features

In accordance with an embodiment, Table 2 below summarizes security behaviors in each permutation.

TABLE 2

| JMS CF | OBS-IC enabled (ObjectBased or ObjectBasedHybrid) | | Non-OBS (The standard WL ICF) |
|---|---|---|---|
| Security-policy Setting | FORCE_JMS_OBS is true | FORCE_JMS_OBS is false | FORCE_JMS_OBS Is not applicable |
| ObjectBased-Delegated | Create JMS connection/context call itself always uses the IC's object-based credentials. Connection credentials override connection/context behavior. If Connection credentials are absent, use IC's. | The same as when FORCE_JMS_OBS is true. | Fail connection/context creation. |
| ObjectBased-Anonymous | Create JMS connection/context call itself always uses the IC's object based credentials. Connection credentials override connection/context behavior. If Connection credentials are absent, use anonymous credentials. | The same as FORCE_JMS_OBS is true | Create JMS connection/context call itself will always use anonymous credentials. Otherwise, same as OBS-IC enabled. |
| ObjectBased-Thread | Create connection/context call itself always uses the IC's object based credential. Connection credentials override connection/context behavior. If Connection credentials are absent, use the subject that was on the thread when the connection was created. | The same as FORCE_JMS_OBS is true | Create connection/context call itself always uses current thread's subject. Otherwise, same as OBS-IC enabled. |
| ThreadBased | The same as ObjectBasedDelegated | Old JMS behavior-CF and Connection operations will be thread based. | Old JMS behavior-CF and Connection operations will be thread based. |

Interaction with WL JMS Features

Interaction of WL JMS features with the new OBS-ICF and OBS-JMS features can be summarized as follows. Unless explicitly called out otherwise, all features are supported for both standalone and Java EE applications.

Basic messaging to a single queue/topic, a distributed topic (Partitioned Distributed Topic or Replicated Distributed Topic) a distributed queue, and a temporary destination is supported. This includes sync or async send and receive, transacted session, ack modes, queue browsers, durable and non-durable subscriptions.

The WL JMS value-added unit-of-order and unit-of-work features work with object-based security.

Store and Forward: This feature (object-based security model) does not impact JMS store-and-forward (server or client). This is because SAF imported destinations currently do not have an option to specify a non-default initial context factory or additional JNDI properties. In addition, a SAF Agent uses one of the default connection factories, which means that it gets the default SecurityPolicy behavior-thread based.

Messaging bridges take care of their security internally already. The feature (object-based security model) has no externally visible impact to messaging bridges that work with OBS enabled use cases.

The JMSDestinationAvailabilityHelper takes care of security internally. The feature (object-based security model) has no externally visible impact on the JMSDestinationAvailabilityHelper feature.

Message-driven beans (MDBs) and JMS wrappers can handle security internally. This feature (object-based security) does not impact Message Driven Beans and JMS Wrappers Object-based security is not supported for applications that use Foreign JMS Server to map to WL JMS. Interaction with this feature must throw where practical.

If a foreign JMS Server is configured to use the OBS-enabled ICF, the configuration will fail and throw a configuration error;

If a foreign JMS Server is configured to use a connection factory that is OBS-JMS enabled, a NotSupported exception will be thrown at JNDI lookup time;

If a local or remote application uses a OBS-IC to look up a foreign JMS Server connection factory or destination, a NotSupported exception will be thrown at JNDI lookup time.

JMS Resource Adapters (RA): JMS RAs already support object-based security semantics via a special JNDI initial context factory, which can be different from the OBS-ICF defined.

Cross Domain Security: Cross-domain security use cases with and without credential mapping can work with OBS semantics described above. Customized logic can be used in client code to handle security subjects for cross-domain cases.

Java Client Libraries: OBS features described above can be supported by Java client libraries, including t3 thin client, install client, saf t3 thin client, IIOP client, and IIOP thin client.

Non-Java Clients: OBS features described above can be supported for a plurality of non-Java clients, for example, C client and DotNet client.

Interfaces

A plurality of public interfaces can be provided to support the object-based security features described above.

Object-based Security Initial Context: A class "weblogic.jms.WLInitialContext" is provided to support OBS-IC. The class implements javax.naming.Context interface, but it only supports limited functionality of the standard. For non-supported methods, it throws OperationNotSupportedException. A weblogic.jms.WLInitialContext object can be created using weblogic.jms.WLInitialContextFactory defined below.

Object-based Security Initial Context Factory and Property Constants: The weblogic.jms.WLInitialContextFactory is provided to support OBS-IC. It implements the standard javax.naming.spi.InitialContextFactory interface. The class supports all functionality that the standard WL Initial Context Factory offers, and additionally supports additional properties. The properties and their valid values are defined in weblogic.jms.extensions.WLJMSOBSContext class as shown below:

```
/**
* Interface for a WebLogic JMS object based security naming context.
* This extends <code>weblogic.jndi.Context</code> with an object based
* security JNDI property and values.
*/
public interface WLJMSOBSContext extends WLContext {
/**
* This property only takes effect when weblogic.jms.WLInitialContextFactory is used.
* It specifies the security policy for WLInitialContextFactory.
* This property is specified in the environment parameter
* passed to the initial context constructor.
* If it is unspecified, the default value OBJECT_BASED will be used.
* @see #OBJECT_BASED
* @see #OBJECT_BASED_HYBRID
* @include-api for-public-api
*/
String SECURITY_POLICY = "weblogic.jndi.securityPolicy";
/**
* With this security policy,
* object based security is enabled for all context operations.
* When no credential is provided, always use anonymous credentials.
* It is the default value.
* @include-api for-public-api
*/
String OBJECT_BASED = "ObjectBased";
/**
* With this security policy,
* object based security is enabled for all context operations.
* When no credential is provided, always use the credential
* that was on the current thread when the context was created.
* @include-api for-public-api
*/
String OBJECT_BASED_HYBRID = "ObjectBasedHybrid";
}
/**The following constants are provided in
weblogic.j2ee.descriptor.wl.constants.JMSConstants.
*/
public final static String THREAD_BASED = "ThreadBased";
public final static String OBJECT_BASED_DELEGATED = "ObjectBasedDelegated";
public final static String OBJECT_BASED_ANONYMOUS = "ObjectBasedAnonymous";
public final static String OBJECT_BASED_THREAD = "ObjectBasedThread";
/**The following setter and getter for the new SecurityPolicy attribute are added to
weblogic.j2ee.descriptor.wl. SecurityParamsBean interface, which is referenced by
JMSConnectionFactoryBean.
* <p>Get the security policy used for the connection factory. </p>
* <p>The default security policy is ThreadBased. </p>
* <p>This attribute is dynamic. It can be changed at any time. However, changing the
*value does not affect existing connections. It only affects new connections made with
*this connection factory.</p>
* @default weblogic.j2ee.descriptor.wl.constants.JMSConstants.THREAD_BASED
* @dynamic true
* @configurable
* @return The SecurityPolicy value
* @include-api for-public-api
* @since 12.2.2.1.0
*/
public java.lang.String getSecurityPolicy( );
/**
* <p>Set the security policy used for the connection factory.</p>
* @param SecurityPolicy The new security policy value.
* @legalValues
weblogic.j2ee.descriptor.wl.constants.JMSConstants.THREAD_BASED,
weblogic.j2ee.descriptor.wl.constants.JMSConstants.OBJECT_BASED_DELEGATED,
weblogic.j2ee.descriptor.wl.constants.JMSConstants.OBJECT_BASED_ANONYMOUS,
weblogic.j2ee.descriptor.wl.constants.JMS
```

```
    Constants.OBJECT_BASED_THREAD
* @include-api for-public-api
*/
public void setSecurityPolicy(java.lang.String SecurityPolicy) throws
IllegalArgumentException;
```

While various embodiments of the present invention have been described above, it should be understood that they have been presented by way of example, and not limitation. The embodiments were chosen and described in order to explain the features and principles of the invention and its practical application. The embodiments illustrate systems and methods in which the various features of the present invention are utilized to improve the performance of the systems and methods by providing new and/or improved functions, and/or providing performance advantages including, but not limited to, reduced resource utilization, increased capacity, increased throughput, improved efficiency, reduced latency, enhanced security, and/or improved ease of use.

Some embodiments of the present invention are described herein with reference to flowcharts and/or block diagrams of methods, apparatus (systems), and computer program products which illustrate the architecture, functionality, process, and/or operation. Each block in the flowchart or block diagram represents an element, function, process, module, segment, or portion of instructions, which comprises one or more executable instructions for implementing the specified function. In some alternative embodiments, the functions noted in a block diagram or flowchart, occur out of the order noted in the figures. For example, two blocks shown in succession may be executed substantially concurrently, or in the reverse order, depending upon the functionality involved. Each block of the flowcharts and/or block diagrams, and combinations of blocks in the flowcharts and/or block diagrams, can be implemented by computer program instructions, and/or by special purpose hardware, and/or combinations of hardware and computer program instructions, which perform the specified functions.

In some embodiments, features of the present invention are implemented in a computer including a processor, a computer-readable storage medium, and a network card/interface for communicating with other computers. In some embodiments, features of the present invention are implemented in a network computing environment comprising a computing system including various types of computer configurations, including personal computers, hand-held devices, multi-processor systems, microprocessor-based or programmable consumer electronics, network PCs, minicomputers, mainframe computers, and the like interconnected by a network. The network can be a Local Area Network (LAN), switch fabric network (e.g. InfiniBand), Wide Area Network (WAN), and/or the Internet. The network can include copper transmission cables, optical transmission fibers, wireless transmission, routers, firewalls, switches, gateway computers and/or edge servers.

In some embodiments, features of the present invention are implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described herein), or any combination of such back-end, middleware, or front-end components interconnected by a network. The computing system can include clients and servers having a client-server relationship to each other. In some embodiments, features of the invention are implemented in a computing system comprising a distributed computing environment in which one or more clusters of computers are connected by a network. The distributed computing environment can have all computers at a single location or have clusters of computers at different remote geographic locations connected by a network.

In some embodiments, features of the present invention are implemented in the cloud as part of, or as a service of, a cloud computing system based on shared, elastic resources delivered to users in a self-service, metered manner using Web technologies. Characteristics of the cloud may include, for example: on-demand self-service; broad network access; resource pooling; rapid elasticity; and measured service. See, e.g. "The NIST Definition of Cloud Computing", Special Publication 800-145 (2011). Cloud deployment models include: Public, Private, and Hybrid. Cloud service models include Software as a Service (SaaS), Platform as a Service (PaaS), Database as a Service (DBaaS), and Infrastructure as a Service (IaaS). The cloud generally refers to the combination of hardware, software, network, and web technologies which delivers shared elastic resources to users. The cloud, as used herein, may include public cloud, private cloud, and/or hybrid cloud embodiments, and may include cloud SaaS, cloud DBaaS, cloud PaaS, and/or cloud IaaS deployment models.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention are implemented by circuitry that is specific to a given function. In other implementations, features are implemented in a computer, computing system, processor, and/or network, configured to perform particular functions using instructions stored e.g. on a computer-readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure.

In some embodiments, the present invention includes a computer program product which is a machine-readable or computer-readable storage medium (media) having instructions comprising software and/or firmware stored thereon/in, which instructions can be used to program or otherwise configure a system such as a computer to perform any of the processes or functions of the present invention. The storage medium or computer readable medium can include any type of media or device suitable for storing instructions and/or data including, but not limited to, floppy disks, hard drives, solid state drives, optical discs, DVD, CD-ROMs, microdrives, and magneto-optical disks, ROMs, RAMs, EPROMs, EEPROMs, DRAMs, VRAMs, flash memory devices, magnetic or optical cards, molecular memories, nanosystems, or variations and combinations thereof. In particular embodiments, the storage medium or computer readable medium is a non-transitory machine-readable storage medium or non-transitory computer-readable storage medium.

The foregoing description is not intended to be exhaustive or to limit the invention to the precise forms disclosed. Additionally, where embodiments of the present invention have been described using a particular series of transactions and steps, it should be apparent to those skilled in the art that, unless stated, the embodiment does not exclude performance of additional transactions and steps. Further, while the various embodiments describe particular combinations of features of the invention it should be understood that different combinations of the features will be apparent to persons skilled in the relevant art as within the scope of the invention. In particular, a feature (device-like or method-like) recited in a given embodiment, variant, or shown in a drawing may be combined with or replace another feature in another embodiment, variant or drawing, without departing from the scope of the present invention. Moreover, it will be apparent to persons skilled in the relevant art that various additions, subtractions, deletions, variations, substitutions of elements with equivalents, and other modifications and changes in form, detail, implementation and application can be made therein without departing from the spirit and scope of the invention. It is intended that the broader spirit and scope of the invention be defined by the following claims and their equivalents.

What is claimed is:

1. A system for supporting object-based security in an application server environment, comprising:
    one or more microprocessors;
    an application server environment executing on the one or more microprocessors, wherein the application server provides Java message service (JMS) resources for consumption by a client application;
    a security subject stored in an object associated with the client application configured to access one or more of the JMS resources, wherein the object associated with the client application is a Java Naming and Directory Interface (JNDI) context;
    wherein the security subject in the JNDI context is created based on either anonymous credentials or credentials provided by a current thread used to create the JNDI initial context, and wherein the JNDI context is created from a JNDI context factory enabled to support object-based security using a property in the JNDI context factory;
    wherein the security subject stored in said object is configured to be used in each of a plurality of calls from the client application to access the one or more the JMS resources.

2. The system of claim 1, wherein the security subject in the JNDI context is created based on credentials provided by the current thread.

3. The system of claim 1, wherein the security subject in the JNDI context is created based on anonymous credentials.

4. The system of claim 1, wherein a lookup call from the JNDI initial context uses the security subject in the JNDI initial context regardless of a security subject attached to a current thread of the lookup call.

5. The system of claim 3, wherein all subsequent operations on the JNDI initial context can be performed on behalf of the security subject stored in the object.

6. The system of claim 1, wherein the security subject represents a grouping of related information for a single entity.

7. The system of claim 1, wherein the plurality of calls are Java Naming and Directory Interface (JNDI) lookup calls or calls for a Java Messaging Service (JMS) operation.

8. A method for supporting object-based security in an application server environment, comprising:
    providing an application server environment executing on one or more microprocessors, wherein the application server provides Java message service (JMS) resources for consumption by a client application;
    storing a security subject in an object associated with the client application configured to access one or more of the JMS resources, wherein the object associated with the client application is a Java Naming and Directory Interface (JNDI) context;
    wherein the security subject in the JNDI context is created based on either anonymous credentials or credentials provided by a current thread used to create the JNDI initial context, and wherein the JNDI context is created from a JNDI context factory enabled to support object-based security using a property in the JNDI context factory; and
    using, in each of a plurality of calls from the client application, the security subject stored in said object to access the one or more of the JMS resources.

9. The method of claim 8, wherein the security subject in the JNDI context is created based on credentials provided by the current thread.

10. The method of claim 8, wherein the security subject in the JNDI context is created based on anonymous credentials.

11. The method of claim 8, wherein a lookup call from the JNDI initial context uses the security subject in the JNDI initial context regardless of a security subject attached to a current thread of the lookup call.

12. The method of claim 8, wherein all subsequent operations on the JNDI initial context can be performed on behalf of the security subject stored in the object.

13. The method of claim 8 wherein, the security subject represents a grouping of related information for a single entity.

14. The method of claim 8, wherein the plurality of calls are Java Naming and Directory Interface (JNDI) lookup calls or calls for a Java Messaging Service (JMS) operation.

15. A non-transitory computer-readable storage medium storing a set of instructions for supporting object-based security in an application server environment, said instructions, when executed by one or more processors, causing the one or more processors to perform steps comprising:

providing an application server environment executing on the one or more microprocessors, wherein the application server provides Java message service (JMS) resources for consumption by a client application;
storing a security subject in an object associated with the client application configured to access one or more of the JMS resources, wherein the object associated with the client application is a JMS connection or a Java Naming and Directory Interface (JNDI) context;
wherein the security subject in the JNDI context is created based on either anonymous credentials or credentials provided by a current thread used to create the JNDI initial context, and wherein the JNDI context is created from a JNDI context factory enabled to support object-based security using a property in the JNDI context factory; and
using, in each of a plurality of calls from the client application, the security subject stored in said object to access the one or more of the JMS resources.

16. The non-transitory computer-readable storage medium of claim 15, wherein the security subject in the JNDI context is created based on credentials provided by the current thread used to create the JNDI context.

17. The non-transitory computer-readable storage medium of claim 15, wherein the security subject in the JNDI context is created based on anonymous credentials.

18. The non-transitory computer-readable storage medium of claim 15, wherein a lookup call from the JNDI initial context uses the security subject in the JNDI initial context regardless of a security subject attached to a current thread of the lookup call.

19. The non-transitory computer-readable storage medium of claim 15, wherein all subsequent operations on the JNDI initial context can be performed on behalf of the security subject stored in the object.

20. The non-transitory computer-readable storage medium of claim 15, wherein the security subject represents a grouping of related information for a single entity.

* * * * *

UNITED STATES PATENT AND TRADEMARK OFFICE
CERTIFICATE OF CORRECTION

PATENT NO. : 11,070,559 B2
APPLICATION NO. : 16/027619
DATED : July 20, 2021
INVENTOR(S) : Xiao et al.

It is certified that error appears in the above-identified patent and that said Letters Patent is hereby corrected as shown below:

On the Title Page

In Column 1, item (72) Inventors, Line 3, delete "Whtehouse," and insert -- Whithouse, --, therefor.

In the Specification

In Column 1, Line 67, after "subjects" insert -- . --.

In Column 16, Line 2, delete "be be" and insert -- be --, therefor.

In Column 16, Line 13, delete "the the" and insert -- the --, therefor.

In Column 16, Line 15, delete "the the" and insert -- the --, therefor.

In Column 16, Line 20, delete "JDNI" and insert -- JNDI --, therefor.

In Column 17, Line 47, delete "default):" and insert -- (default): --, therefor.

In Column 17, Line 47, delete "Object based" and insert -- Object-based --, therefor.

In Column 17, Line 51, delete "Object based" and insert -- Object-based --, therefor.

In Column 18, Line 54, delete "opiton" and insert -- option --, therefor.

In Column 19, Line 26, delete "Object based" and insert -- Object-based --, therefor.

In Column 20, Line 40, after "Wrappers" insert -- insertion. --.

In Columns 21-22, Line 15, delete "Object based" and insert -- Object-based --, therefor.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*

In Columns 21-22, Line 16, delete "Object based" and insert -- Object-based --, therefor.

In Columns 21-22, Line 33, delete "Object based" and insert -- Object-based --, therefor.